(12) United States Patent
Levy et al.

(10) Patent No.: US 10,616,113 B2
(45) Date of Patent: Apr. 7, 2020

(54) LONGEST PREFIX MATCH USING A BINARY SEARCH TREE WITH COMPRESSED HASH TABLES

(71) Applicant: Mellanox Technologies TLV Ltd., Raanana (IL)

(72) Inventors: Gil Levy, Hod Hasharon (IL); Aviv Kfir, Nili (IL)

(73) Assignee: Mellanox Technologies TLV Ltd., Raanana (IL)

( * ) Notice: Subject to any disclaimer, the term of this patent is extended or adjusted under 35 U.S.C. 154(b) by 0 days.

(21) Appl. No.: 16/039,372

(22) Filed: Jul. 19, 2018

(65) Prior Publication Data

US 2020/0028781 A1 Jan. 23, 2020

(51) Int. Cl.
*H04L 12/745* (2013.01)
*H04L 12/753* (2013.01)
*H04L 12/741* (2013.01)
*H04L 12/743* (2013.01)

(52) U.S. Cl.
CPC ............ *H04L 45/748* (2013.01); *H04L 45/48* (2013.01); *H04L 45/54* (2013.01); *H04L 45/7453* (2013.01)

(58) Field of Classification Search
CPC ... H04L 45/748; H04L 45/7453; H04L 45/48; H04L 45/54; H04L 12/44; H04L 45/02
See application file for complete search history.

(56) References Cited

U.S. PATENT DOCUMENTS

| | | | |
|---|---|---|---|
| 6,754,662 B1 | 6/2004 | Li et al. | |
| 9,160,650 B2 | 10/2015 | Zhang et al. | |
| 9,596,181 B1 | 3/2017 | Goel et al. | |
| 2001/0028651 A1 | 10/2001 | Murase | |
| 2004/0085953 A1* | 5/2004 | Davis | H04L 45/00 370/356 |
| 2005/0038907 A1 | 2/2005 | Roeder et al. | |
| 2005/0091443 A1* | 4/2005 | Hershkovich | G06F 16/2246 711/100 |

(Continued)

OTHER PUBLICATIONS

U.S. Appl. No. 15/469,530 office action dated Dec. 14, 2018.

(Continued)

*Primary Examiner* — Dady Chery
(74) *Attorney, Agent, or Firm* — Kligler & Associates Patent Attorneys Ltd (57) ABSTRACT

A method for packet processing includes representing a routing table for a network as a binary search tree of address prefixes ordered by prefix lengths. For each node j in the binary search tree, a respective hash table is stored, including entries representing the address prefixes of length $L_j$. Each address prefix includes $L_j$-c most significant bits (MSB) and c least significant bits (LSB), and each entry in the respective hash table includes a matching value corresponding to the $L_j$-c MSB of one or more of the address prefixes and one or more action codes indexed by the c LSB of the one or more of the address prefixes. Upon receiving from the network a data packet having a destination address, the binary search tree is traversed to find a longest prefix match by performing, at each node j, a hash lookup in the respective hash table.

19 Claims, 3 Drawing Sheets

(56) References Cited

U.S. PATENT DOCUMENTS

| | | | |
|---|---|---|---|
| 2006/0209725 A1* | 9/2006 | Cadambi | H04L 12/2854 370/255 |
| 2008/0212586 A1 | 9/2008 | Wang et al. | |
| 2009/0077076 A1 | 3/2009 | Berger et al. | |
| 2010/0040066 A1 | 2/2010 | Hao et al. | |
| 2010/0080223 A1 | 4/2010 | Wong et al. | |
| 2012/0246411 A1 | 9/2012 | Birka et al. | |
| 2013/0297879 A1 | 11/2013 | Abali et al. | |
| 2015/0039836 A1 | 2/2015 | Wang et al. | |
| 2015/0098470 A1 | 4/2015 | Sun et al. | |
| 2015/0131665 A1 | 5/2015 | Griswold | |
| 2016/0335296 A1 | 11/2016 | Sathe et al. | |
| 2017/0366459 A1 | 12/2017 | Kfir et al. | |
| 2017/0366502 A1 | 12/2017 | Kravchik et al. | |
| 2018/0278525 A1 | 9/2018 | Levy et al. | |

OTHER PUBLICATIONS

Gupta et al., "Routing Lookups in Hardware at Memory Access Speeds", Proceedings of the Conference on Computer Communications (IEEE INFOCOMM), vol. 3, pp. 1241-1248, San Francisco, USA, Mar./Apr. 1998.

Kasnavi et al., "A cache-based internet protocol address lookup architecture", Computer Networks, vol. 52, pp. 303-326, year 2008.

Kim et al, "Revisiting Route Caching: TheWorld Should Be Flat", Proceedings of the 10th International Conference on Passive and Active Network Measurement (PAM), 10 pages, Seoul, Korea, Apr. 1-3, 2009.

Kohler et al., "Observed Structure of Addresses in IP Traffic", IEEE/ACM Transactions on Networking, vol. 14, No. 6, pp. 1207-1218, Dec. 2006.

Liu et al., "Efficient FIB Caching using Minimal Non-overlapping Prefixes", ACM SIGCOMM Computer Communication Review, vol. 43, No. 1, pp. 15-21, Jan. 2013.

Sarrar et al., "Leveraging Zipf's Law for Traffic Offloading", ACM SIGCOMM Computer Communication Review, vol. 42, No. 1, pp. 17-22, Jan. 2012.

Wand Network Research Group, 7 pages, Apr. 22, 2010 (downloaded from http://wand.net.nz/wits/catalogue.php).

The CAIDA Anonymized Internet Traces 2014 Dataset, 2 pages, 2014 https://www.caida.org/data/passive/passive_2014_dataset.xml.

Waldvogel et al., "Scalable High-Speed Prefix Matching", Proceedings of the ACM SIGCOMM 97 Conference on applications, technologies, architectures, and protocols for computer communication, Cannes, France, pp. 25-36, Sep. 15-18, 1997.

Levy et al., U.S. Appl. No. 15/925,815, filed Mar. 20, 2018.

Levy et al., U.S. Appl. No. 15/830,021, filed Dec. 4, 2017.

U.S. Appl. No. 15/830,021 office action dated Sep. 26, 2019.

\* cited by examiner

LONGEST PREFIX MATCH USING A BINARY SEARCH TREE WITH COMPRESSED HASH TABLES

FIELD OF THE INVENTION

The present invention relates generally to packet network communications, and particularly to apparatus and methods for packet routing in such networks.

BACKGROUND

Modern internet routers determine data routing based on searching for a packet destination Internet Protocol address (DIP) in a database of forwarding information known as a routing table. The routing table, rather than storing a full DIP, stores only some of the leading portion, known as a prefix. The prefix comprises some number of the most significant bits (MSB) of the DIP. The remaining bits are treated as "don't care" bits for purpose of a DIP search in the routing table. Computers that belong to a subnetwork are addressed by a common prefix in their IP address.

The most specific of the matching table entries—the one with the longest subnet mask—is called the longest prefix match (LPM). This is the entry in the routing table in which the largest number of leading address bits of the destination address match those in the table entry. The router selects this entry to route the packet.

Searching the routing table for the LPM is a bottleneck in routing throughput. Implementing LPM is challenging, as the DIP of each incoming packet has to be compared against the entries of the routing table, which can be very large, for example more than 500,000 entries, in order to find the best (longest) prefix match. Various hardware-based solutions have been proposed, but the circuitry required to implement such solutions becomes complex. Moreover, the increasing amount of Internet traffic and demands for reduced latency have resulted in relatively costly router circuitry having high power consumption and heat dissipation.

Some methods for implementing a longest prefix match in a routing table involve constructing a binary search tree on prefix lengths with markers. A method of this sort is described in an article entitled, "Scalable High-Speed Prefix Matching," by Waldvogel et al., published in *Proceedings of the ACM SIGCOMM '97 Conference on Applications, Technologies, Architectures, and Protocols for Computer Communication*, pages 25-36 (1997), which is incorporated herein by reference. The method requires addition of new entries, called markers, in the binary search tree to ensure that the correct result is obtained for all the packets. When there is a match on a given node of the tree, that information can be used to narrow down the search.

U.S. Patent Application Publication 2017/0366459, whose disclosure is incorporated herein by reference, describes an optimization of the solution described in the above-noted Waldvogel paper that can be easily implemented in hardware. The search jumps on a match to the next level of the tree that needs to be checked, thus reducing both the number of accesses and the number of markers. The jump captures most of the benefits that can be extracted from information provided by a match.

Documents incorporated by herein reference are to be considered an integral part of the application except that, to the extent that any terms are defined in these incorporated documents in a manner that conflicts with definitions made explicitly or implicitly in the present specification, only the definitions in the present specification should be considered.

SUMMARY

Embodiments of the present invention that are described hereinbelow provide improved methods, apparatus and software for processing data packets in a network.

There is therefore provided, in accordance with an embodiment of the invention, a method for packet processing, which includes representing a routing table for a network as a binary search tree of address prefixes ordered by prefix lengths, such that each node j in the binary search tree corresponds to a respective prefix length $L_j$. For each node j in the binary search tree, a respective hash table is stored, including entries representing the address prefixes of length $L_j$. Each address prefix includes $L_j$-c most significant bits (MSB) and c least significant bits (LSB), and each entry in the respective hash table includes a matching value corresponding to the $L_j$-c MSB of one or more of the address prefixes and one or more action codes indexed by the c LSB of the one or more of the address prefixes.

Upon receiving from the network a data packet having a destination address, the binary search tree is traversed to find a longest prefix match between the destination address and the address prefixes by extracting, at each node j that is traversed, a key of length $L_j$ from the destination address. A hash lookup is performed in the respective hash table over the $L_j$-c MSB of the key to find a matching entry, and an action code indicated by the c LSB of the key is selected from the matching entry. The data packet is processed in accordance with the action code indicated by the matching entry that corresponds to the longest prefix match.

In a disclosed embodiment, the action codes include pointers to a table of actions, and processing the packet includes reading and executing an action indicated by a pointer in the matching entry found by traversing the binary search tree.

In some embodiments, the binary search tree includes a root node and two subtrees including parent nodes and descendant nodes, including leaf nodes, disposed in hierarchical levels of the subtrees, and the method includes placing respective markers in the parent nodes of the binary search tree to guide accessing the descendant nodes while traversing the binary search tree in a direction from the root node to the leaf nodes. In a disclosed embodiment, storing the respective hash table includes inserting one or more of the markers among the action codes in the entries of the hash table. In one embodiment, the markers include jump markers, which guide traversal of the search tree from a given parent node to a descendant node that is separated from the parent node in the binary search tree by at least one intermediate hierarchical level. Typically, the markers in the parent nodes indicate whether longer compatible prefixes exist in a lower hierarchical level of one of the subtrees.

In one embodiment, c=1, and each entry in the respective hash table of each node in the binary search tree is configured to contain two different actions indicated by respective binary values of the single LSB of the address prefixes represented by the entry.

In another embodiment, c=2, and each entry in the respective hash table of each node in the binary search tree is configured to contain four different actions indicated by respective values of the two LSB of the address prefixes represented by the entry.

Alternatively, when c=2, storing the respective hash table includes creating, in the respective hash table of a given node j in the binary search tree, two entries representing the $L_j$-2 MSB that are shared by a group of the address prefixes of length $L_j$, wherein each of the two entries in the hash table is configured to contain two different actions indicated by two respective values of the two LSB of the address prefixes in the group.

There is also provided, in accordance with an embodiment of the invention, packet processing apparatus, including a plurality of interfaces configured to receive and transmit data packets from and to a network. A memory is configured to store a representation of a routing table for the network as a binary search tree of address prefixes ordered by prefix lengths, such that each node j in the binary search tree corresponds to a respective prefix length $L_j$, and to store for each node j in the binary search tree, a respective hash table including entries representing the address prefixes of length $L_j$. Each address prefix includes $L_j$-c most significant bits (MSB) and c least significant bits (LSB), and each entry in the respective hash table includes a matching value corresponding to the $L_j$-c MSB of one or more of the address prefixes and one or more action codes indexed by the c LSB of the one or more of the address prefixes.

Packet processing circuitry is configured, upon receiving through one of the interfaces a data packet having a destination address, to traverse the binary search tree to find a longest prefix match between the destination address and the address prefixes by extracting, at each node j that is traversed, a key of length $L_j$ from the destination address, performing a hash lookup in the respective hash table over the $L_j$-c MSB of the key to find a matching entry, and selecting from the matching entry an action code indicated by the c LSB of the key, and to process the data packet in accordance with the action code indicated by the matching entry that corresponds to the longest prefix match.

There is additionally provided, in accordance with an embodiment of the invention, a computer software product, including a non-transitory computer-readable medium in which program instructions are stored. The instructions, when read by a programmable processor, cause the processor to store, in a memory, a representation of a routing table for a network as a binary search tree of address prefixes ordered by prefix lengths, such that each node j in the binary search tree corresponds to a respective prefix length $L_j$, and to store for each node j in the binary search tree, a respective hash table including entries representing the address prefixes of length $L_j$. Each address prefix includes $L_j$-c most significant bits (MSB) and c least significant bits (LSB), and each entry in the respective hash table includes a matching value corresponding to the $L_j$-c MSB of one or more of the address prefixes and one or more action codes indexed by the c LSB of the one or more of the address prefixes.

The instructions cause the processor, upon receiving from the network a data packet having a destination address, to traverse the binary search tree to find a longest prefix match between the destination address and the address prefixes by extracting, at each node j that is traversed, a key of length $L_j$ from the destination address, performing a hash lookup in the respective hash table over the $L_j$-c MSB of the key to find a matching entry, and selecting from the matching entry an action code indicated by the c LSB of the key, and to process the data packet in accordance with the action code indicated by the matching entry that corresponds to the longest prefix match.

The present invention will be more fully understood from the following detailed description of the embodiments thereof, taken together with the drawings in which:

DETAILED DESCRIPTION OF EMBODIMENTS

Overview

As explained in the above-mentioned article by Waldvogel et al., an IP routing table for a packet network can be efficiently represented as a binary search tree of address prefixes ordered by prefix lengths. In this representation, each node j in the binary search tree corresponds to a respective prefix length $L_j$. (The value of the index "j" identifies the individual nodes of the binary search tree, and thus the term "node j," as used in the present description and in the claims, refers to any given node in the tree, with an arbitrary index value j.) The binary search tree comprises a root node and two subtrees including parent nodes and descendant nodes (down to the leaf nodes), disposed in hierarchical levels of the subtrees Waldvogel et al. suggest that markers be inserted on some nodes of the tree to ensure that the search leads to an existing entry at a longer length. The markers provide branching guidance for a search of the tree, indicating whether the longer or shorter subtree should be selected. (The markers are similar to prefixes of an IP address, but lack associated information fields.) In the improvements that are described in the above-mentioned U.S. Patent Application Publication 2017/0366459, the markers include jump markers, which guide traversal of the search tree from a given parent node to a descendant node that is separated from the parent node in the binary search tree by at least one intermediate hierarchical level.

In each node j that is encountered in the traversal of the search tree for a given data packet, a key of length $L_j$ is extracted from the packet, corresponding to the $L_j$ most significant bits (MSB) of the DIP. This key is applied in an exact match lookup to the address prefixes of length $L_j$ that are associated with this node. In some implementations, the address prefixes and corresponding actions for each node are stored in a respective hash table. A selected hash function is applied to the key, and the result is used in looking up the corresponding entry in the hash table. Thus, in implementations that are known in the art, each address prefix in the routing table will have its own hash table entry. Considering the size of routing tables in modern IP networks (possibly more than 500,000 entries, as noted above), the hash tables can consume a great deal of memory.

Embodiments of the present invention that are described herein compress the hash tables that are used in traversal of a binary search tree that is used in packet processing, and thus reduce the memory that the hash tables consume. As explained below in detail, this compression is based on arranging the hash tables so that two or more prefixes can share the same hash table entry, in a manner that does not substantially impact the efficiency of the lookup process. In experimental evaluation of the present methods on large databases of IP addresses, the volume of memory consumed by the hash tables was reduced by more than 30%.

In the disclosed embodiments, for each node j in the binary search tree, a respective hash table is constructed by dividing each address prefix (of length $L_j$) into a mask value consisting of the $L_j$-c most significant bits (MSB), and a remainder consisting of the c least significant bits (LSB) of the prefix. Typically, c is a small integer, for example c=1, 2 or 3, which determines the maximum number of prefixes that may be mapped to the same entry (up to 2c prefixes, as will be illustrated below). Each entry in the respective hash table for node j will then comprise a matching value corresponding to the mask value given by the $L_j$-c MSB of one or more of the address prefixes, along with one or more action codes indexed by the remainders given by the c LSB of the address prefixes.

In other words, prefixes that share a given mask value will map to the same hash entry, but will have different action codes indicated by their different remainders. Typically, the action codes are short and, in common implementations, simply point to an action table where more detailed instructions are stored. (This sort of pointer-based scheme is often used in routing tables, where many prefixes commonly lead to the same "action," in the form of an egress interface through which packets matching any of the given prefixes are to be transmitted.)

Accommodating multiple prefixes, with different action codes, in the same hash entry means that the hash entries may be longer than those required in conventional schemes, in which each hash entry contains only a single action (or action code). In large routing tables, however, in which there are often multiple prefixes with the same mask value, the reduction in the number of hash entries will more than outweigh the small increase in the size of the entries. Furthermore, in many routers, as well as other network devices, the memory is shared among various different functions and, for this purpose, has a fixed entry width that is greater than the width needed for routing entries. In this case, it may be possible to accommodate the longer hash table entries that are used in embodiments of the present invention within the existing entry width.

When a router (or other network device) receives a data packet from a network, it traverses the binary search tree using these hash tables in order to find the longest prefix match between the destination address and the address prefixes. For this purpose, at each node j that is traversed, packet processing circuitry in the router extracts a key of length $L_j$ from the destination address, but then performs a hash lookup in the respective hash table over only the mask portion of the key, i.e., the $L_j$-c MSB of the key. The resulting hash value points to the matching entry in the hash table, and the packet processing circuitry then selects the action code in the matching entry that is indicated by the remainder (i.e., the c LSB) of the key. These action codes can comprise not only pointers to an action table, but also markers in the parent nodes of the binary search tree, to guide the packet processing circuitry in accessing the appropriate descendant nodes. At the conclusion of the traversal, the packet processing circuitry processes the data packet in accordance with the action code indicated by the matching entry that corresponds to the longest prefix match.

System Description

Figure 1:
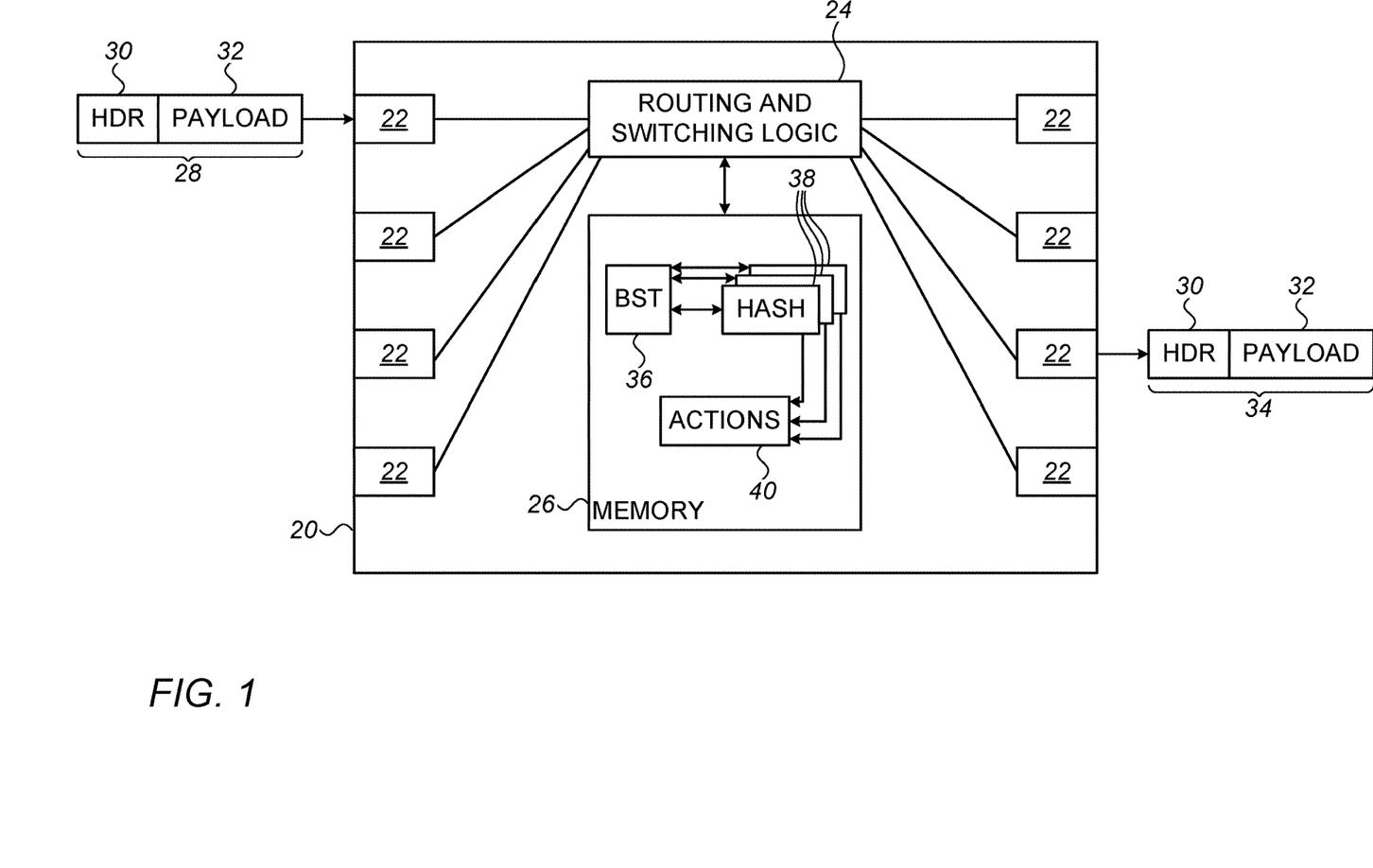
FIG. 1 is a block diagram that schematically shows a packet router, in accordance with an embodiment of the invention.

FIG. 1 is a block diagram that schematically shows a packet router 20, in accordance with an embodiment of the invention. Router 20 is shown by way of example as a sort of packet processing apparatus in which the methods described below can be implemented. Alternatively, the principles of the present invention may be applied, mutatis mutandis, in other sorts of network elements, such as other sorts of switches and network interface devices. Router 20 can be implemented in a single integrated circuit chip or in a set of chips connected together on one or more circuit boards or other suitable media.

Router 20 comprises a plurality of interfaces 22, which receive and transmit data packets from and to a packet data network, such as an Internet Protocol (IP) network. Interfaces 22 can comprise, for example, network ports, which typically include hardware circuits that implement physical layer (PHY) and medium access control (MAC) interface functions, as are known in the art.

Packet processing circuitry 24, coupled between interfaces 22, comprises routing and switching logic configured to implement the functions described herein, along with other processing functions that are known in the art. For these purposes, packet processing circuitry 24 typically comprises hardware logic circuits, which may be hard-wired or programmable. Additionally or alternatively, at least some of the functions of packet processing circuitry 24 may be carried out by a programmable processor under the control of suitable software or firmware. Such software may be downloaded to router 20 in electronic form, over a network, for example. Additionally or alternatively, the software or firmware may be stored on tangible, non-transitory computer-readable media, such as optical, magnetic or electronic memory media. Although packet processing circuitry 24 is shown in FIG. 1, for the sake of simplicity, as a single functional block, in practice the functions of this circuitry can be divided among multiple circuit components, as will be apparent to those skilled in the art.

A memory 26 in router 20 can be used both as a buffer, for holding data packets in transit through the router, and to store routing tables and other data structures that are used by packet processing circuitry 24 in processing data packets. In the pictured example, router 20 receives an incoming packet 28, comprising a header 30 and a payload 32, through one of interfaces 22. Packet processing circuitry 24 reads header 30, and uses the header data in performing routing and switching functions, resulting in transmission of an outgoing packet 34 through another interface. For these purposes, packet processing circuitry 24 extracts the DIP from header 30 of incoming packet 30 and applies the DIP in searching for a longest prefix match in the routing tables, using a binary search tree, as described below.

Figure 2:
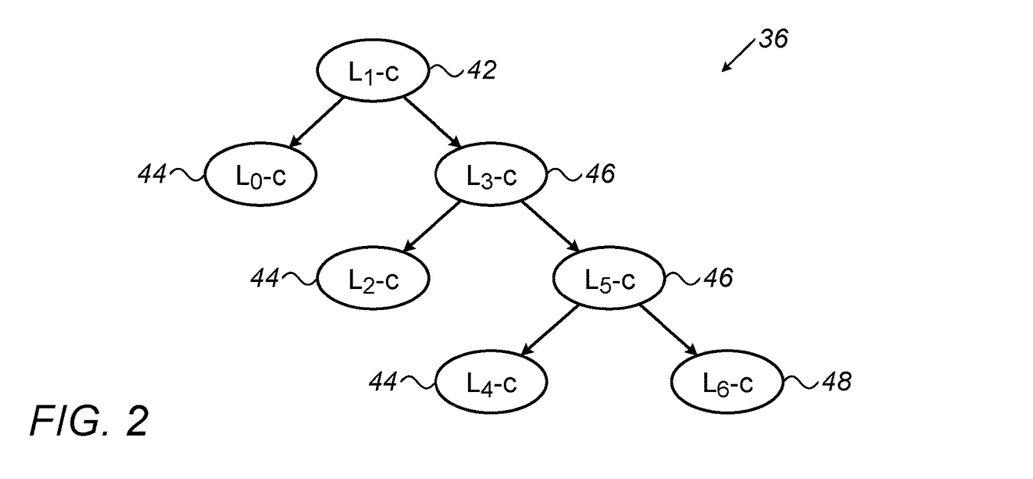
FIG. 2 is a graph that schematically illustrates a binary search tree, in accordance with an embodiment of the invention.
Figure 3:
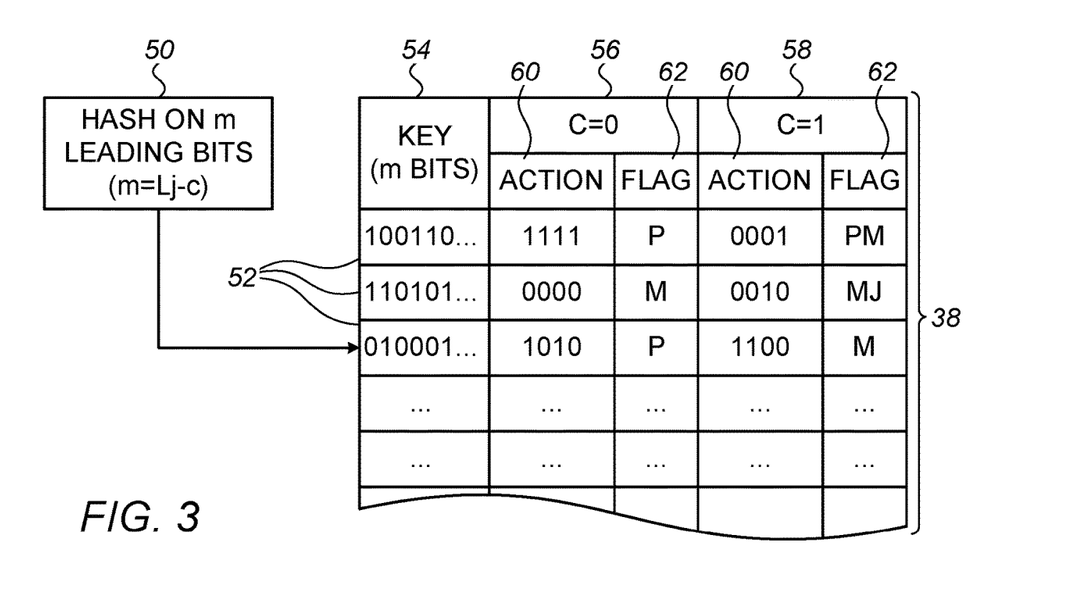
FIG. 3 is a block diagram that schematically illustrates a hash table, in accordance with an embodiment of the invention.

Packet processing circuitry 24 carries out the search for the longest prefix match using a binary search tree (BST) 36 that is stored in memory 26. (An example of such a BST is shown in FIG. 2.) For each node j in the binary search tree, memory 26 also holds a respective hash table 38, comprising entries representing address prefixes of length $L_j$. (An example hash table is shown in FIG. 3.) Each entry in the respective hash table comprises a matching tag corresponding to the $L_j$-c MSB of one or more of the address prefixes in the routing table and one or more action codes indexed by the c LSB of the address prefixes. The action codes in the present example point to entries in an action table 40, which typically identify the egress interface through which outgoing packet 34 is to be transmitted, as well as other operations to be applied to the packet, such as changes in the packet header fields. When packet processing circuitry 24 has finished traversing BST 36 and found the longest prefix match for data packet 28, it processes the data packet in accordance with the corresponding action code.

Data Structures

FIG. 2 is a graph that schematically shows a simplified example of binary search tree 36, in accordance with an embodiment of the invention. Further details of the construction and contents of such a tree, including prefixes, markers, and prefix/markers, are presented in the above-mentioned article by Waldvogel et al. and in U.S. Patent Application Publication 2017/0366459. Alternatively, the principles of the present invention may be applied to other types of binary search trees, not necessarily including markers of this type.

Tree 36 comprises a root node 42 (which is itself a parent node) and other parent nodes 46, with two sub-trees below each parent node. The sub-trees can contain further parent nodes 46, as well as descendant nodes 44, 48, which are leaf nodes, disposed in hierarchical levels of the subtrees. Markers are placed in the parent nodes of the binary search tree to guide packet processing circuitry 24 in accessing the descendant nodes while traversing the binary search tree in a direction from the root node to the leaf nodes. The markers in the parent nodes indicate whether longer compatible prefixes exist in a lower hierarchical level of one of the subtrees. Optionally, the markers may include jump markers, which guide traversal of the search tree from a given parent node to a descendant node that is separated from the parent node in the binary search tree by at least one intermediate hierarchical level, as described in U.S. Patent Application Publication 2017/0366459.

The nodes of binary search tree 36 are annotated according to the length $L_j$ of the corresponding prefixes, wherein the value of j runs from 0 to 6 in the pictured example. (As noted earlier, j is an arbitrary index, which identifies the nodes of the search tree and does not restrict $L_j$ to any particular value.) The search looks for an entry (prefix, prefix/marker or marker) matching the DIP of the current packet on each node, using a search mask that selects the $L_j$-c MSB of the DIP at each node. Specifically, packet processing circuitry 24 computes a hash over the search mask, and then uses the hash result in looking up the mask value in a corresponding hash table (FIG. 1) If the node contains a prefix that is not designated to function as a marker, and that prefix (including both the $L_j$-c MSB and the c-bit remainder) matches the DIP, then the process ends. If a prefix/marker or a marker matches, then the search moves to the right branch in the sub-tree below the present node. Otherwise the search moves to the left. The process ends in all cases when a leaf node is encountered.

FIG. 3 is a block diagram that schematically illustrates hash table 38 for a given node in binary search tree 26, in accordance with an embodiment of the invention. Hash table 38 comprises multiple entries 52, which are ordered in the table and accessed according to the value of a predefined hash function 50, which is computed over a key consisting of the m most significant (leading) bits of the prefix (or DIP) in question, wherein for any node j in binary search tree 26, $m=L_j$-c. For the sake of simplicity, table 38 is configured as a single-way cache, meaning that there is a single entry corresponding to each hash value, and thus to each m-bit key. In alternative embodiments (not shown in the figures), a multi-way hash table may be used, in which a given hash value can map to multiple entries in the table.

Each entry 52 in hash table 38 comprises a matching tag 54 and corresponding action codes 56 and 58. Matching tag 54 (also referred to as a matching value) corresponds to the m MSB of one or more of the address prefixes in the routing table of length $L_j$. As noted earlier, matching tag 54 can match multiple different prefixes that have the same m MSB but different values of the remainder, corresponding to the c LSB of each prefix. Thus, each entry 52 can contain multiple action codes, which are indexed by the remainder value. In the pictured example, c=1, meaning that two prefixes of length $L_j$ can share the same entry, with action codes 56 and 58 for remainder values of 0 and 1, respectively. In other words, each entry 52 in the respective hash table 38 of each node in binary search tree 36 is configured to contain two different actions indicated by the respective binary values of the single LSB of the two different address prefixes that can correspond to this entry.

Each action code 56, 58 comprises a pointer 60 to an appropriate entry 52 in action table 40 and one or more flag bits 62. When markers are incorporated in the binary search tree to guide circuitry 24 in traversing the tree, as explained above, the marker types can be indicated by appropriate flag bits 62 in the action codes of the corresponding entries. In the pictured example, the flag bits mark entries as "prefixes" (P), "markers" (M), "prefix-markers" (PM) and "markers with jump" (MJ). (There may also be entries marked PMJ—"prefix-markers with jump.")

Alternatively, when c=2, for any given prefix length $L_j$, up to four prefixes may have the same matching tag of length $m=L_j$-2. For this purpose, the respective hash table entries of each node in the binary search tree can be configured to contain four different actions indicated by respective values of the two LSB of the address prefixes represented by the entry. Alternatively, the hash table may be configured as a two-way associative table, containing two entries representing the $L_j$-2 MSB that are shared by a group of the address prefixes of length $L_j$. Each of these two entries is configured to contain two different actions indicated by two respective values of the two LSB of the address prefixes in the group.

In other embodiments, c may be equal to three or more, with appropriate adjustments to the configuration of hash tables 38 (with more actions per entry and/or more ways). In evaluations performed over IP address databases, however, the inventors found that better results are obtained for c=1 or c=2.

Method for Longest Prefix Matching Using Hash Tables

Figure 4:
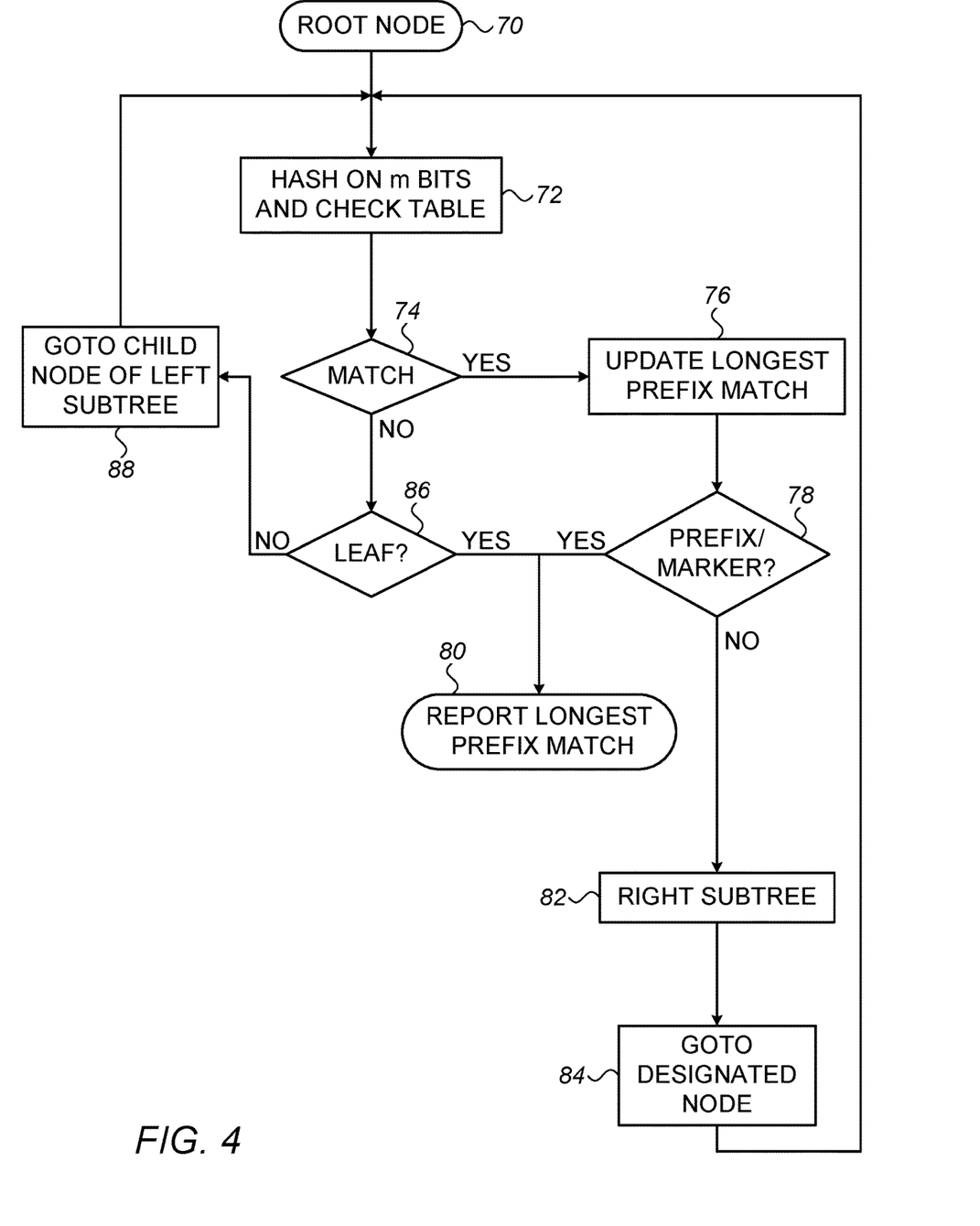
FIG. 4 is a flow chart that schematically illustrates a method for longest prefix matching using a binary search tree and compressed hash tables, in accordance with an embodiment of the invention.

FIG. 4 is a flow chart that schematically illustrates a method for longest prefix matching using a binary search tree and compressed hash tables, in accordance with an embodiment of the invention. The method is described, for the sake of convenience and clarity, with reference to router 20, as shown in FIG. 1, and the data structures shown in FIGS. 2 and 3, although it may alternatively be implemented in other sorts of network elements and modified data structures, as noted above. The method assumes as its starting point that binary search tree 36, representing a routing table, has been established in memory 26 as explained above, with markers and possibly jump information placed in the nodes, along with a respective hash table 38 for each node in the binary search tree.

The method is initiated at root node 42 when packet 28 is received through one of interfaces 22, at a search initiation step 70. Packet processing circuitry 24 extracts the DIP from header 30 for use in the prefix matching process. At a hash lookup step 72, packet processing circuitry 24 computes the appropriate hash function over the m MSB of the DIP, wherein m=$L_j$-c, as defined above. Packet processing circuitry 24 uses the hash result in accessing the appropriate hash table 38 for the current node in memory 26.

Next, at a match decision step 74, packet processing circuitry 24 determines whether the hash table contains a match of compatibility in the current node between the DIP of the packet and matchable prefix content in the current node. If the determination at step 74 is affirmative, then the best prefix match found thus far in the search is updated according to the match, at an update step 76. Packet processing circuitry 24 then determines whether the match is a prefix and the present node has no prefix/marker, at a prefix/marker checking step 78. If the determination at step 78 is affirmative, then the search terminates at a final step 80. The longest prefix match recorded in iterations through step 74 is reported, and the corresponding entry 52 in the corresponding hash table 38 is used to identify the action in table 40 that is to be applied in processing the packet.

On the other hand, if the determination at step 78 is negative, meaning that a marker was found in the matching entry, then control proceeds to a right subtree selection step 82. Packet processing circuitry 24 reads the marker in order to choose the next node to be visited in binary search tree 36, at a node access step 84. If the marker is a jump marker, the destination of the next step in the search is set according to the destination in the jump information, skipping at least one intermediate level of the tree. Otherwise, the destination of the next step of the search is set to be the child node in the right subtree of the current node. After performing step 84, control returns to step 72 to iterate the procedure.

If the determination at decision step 74 was negative, i.e., no matchable prefix content was found in the current node, then packet processing circuitry 24 determines whether the current node is a leaf node, at a leaf checking step 86. If the determination at step 86 is affirmative, then the search is over, and control proceeds to final step 80. In this case, the longest prefix match so far recorded is used in identifying the action to be applied to the packet. Otherwise, control proceeds to a left subtree selection step 88, where the next step in the search is at the child node in the left subtree of the current node. Control then returns to step 72 for another iteration.

After reaching step 80, by whatever path through the method shown in FIG. 4, packet processing circuitry 24 reads the required action from table 40 and processes the packet accordingly.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for packet processing, comprising:
   representing a routing table for a network as a binary search tree of address prefixes ordered by prefix lengths, such that each node j in the binary search tree corresponds to a respective prefix length $L_j$;
   for each node j in the binary search tree, storing a respective hash table comprising entries representing the address prefixes of length $L_j$, each address prefix comprising $L_j$-c most significant bits (MSB) and c least significant bits (LSB), and each entry in the respective hash table comprising a matching value corresponding to the $L_j$-c MSB of one or more of the address prefixes and one or more action codes indexed by the c LSB of the one or more of the address prefixes;
   upon receiving from the network a data packet having a destination address, traversing the binary search tree to find a longest prefix match between the destination address and the address prefixes by extracting, at each node j that is traversed, a key of length $L_j$ from the destination address, performing a hash lookup in the respective hash table over the $L_j$-c MSB of the key to find a matching entry, and selecting from the matching entry an action code indicated by the c LSB of the key;
   processing the data packet in accordance with the action code indicated by the matching entry that corresponds to the longest prefix match; and
   transmitting the data packet in accordance with the action code indicated by the matching entry that corresponds to the longest prefix match.

2. The method according to claim 1, wherein the action codes comprise pointers to a table of actions, and wherein processing the packet comprises reading and executing an action indicated by a pointer in the matching entry found by traversing the binary search tree.

3. The method according to claim 1, wherein the binary search tree comprises a root node and two subtrees including parent nodes and descendant nodes, comprising leaf nodes, disposed in hierarchical levels of the subtrees, and wherein the method comprises placing respective markers in the parent nodes of the binary search tree to guide accessing the descendant nodes while traversing the binary search tree in a direction from the root node to the leaf nodes.

4. The method according to claim 3, wherein storing the respective hash table comprises inserting one or more of the markers among the action codes in the entries of the hash table.

5. The method according to claim 3, wherein the markers include jump markers, which guide traversal of the search tree from a given parent node to a descendant node that is separated from the parent node in the binary search tree by at least one intermediate hierarchical level.

6. The method according to claim 3, wherein the markers in the parent nodes indicate whether longer compatible prefixes exist in a lower hierarchical level of one of the subtrees.

7. The method according to claim 1, wherein c=1, and wherein each entry in the respective hash table of each node in the binary search tree is configured to contain two different actions indicated by respective binary values of the single LSB of the address prefixes represented by the entry.

8. The method according to claim 1, wherein c=2, and wherein each entry in the respective hash table of each node in the binary search tree is configured to contain four different actions indicated by respective values of the two LSB of the address prefixes represented by the entry.

9. The method according to claim 1, wherein c=2, and wherein storing the respective hash table comprises creating, in the respective hash table of a given node j in the binary search tree, two entries representing the $L_j$-2 MSB that are shared by a group of the address prefixes of length $L_j$, wherein each of the two entries in the hash table is configured to contain two different actions indicated by two respective values of the two LSB of the address prefixes in the group.

10. Packet processing apparatus, comprising:
    a plurality of interfaces configured to receive and transmit data packets from and to a network;

a memory, which is configured to store a representation of a routing table for the network as a binary search tree of address prefixes ordered by prefix lengths, such that each node j in the binary search tree corresponds to a respective prefix length $L_j$, and to store for each node j in the binary search tree, a respective hash table comprising entries representing the address prefixes of length $L_j$, each address prefix comprising $L_j$-c most significant bits (MSB) and c least significant bits (LSB), and each entry in the respective hash table comprising a matching value corresponding to the $L_j$-c MSB of one or more of the address prefixes and one or more action codes indexed by the c LSB of the one or more of the address prefixes; and packet processing circuitry, which is configured, upon receiving through one of the interfaces a data packet having a destination address, to traverse the binary search tree to find a longest prefix match between the destination address and the address prefixes by extracting, at each node j that is traversed, a key of length $L_j$ from the destination address, performing a hash lookup in the respective hash table over the $L_j$-c MSB of the key to find a matching entry, and selecting from the matching entry an action code indicated by the c LSB of the key, and to process the data packet in accordance with the action code indicated by the matching entry that corresponds to the longest prefix match.

11. The apparatus according to claim 10, wherein the action codes comprise pointers to a table of actions, and wherein processing the packet comprises reading and executing an action indicated by a pointer in the matching entry found by traversing the binary search tree.

12. The apparatus according to claim 10, wherein the binary search tree comprises a root node and two subtrees including parent nodes and descendant nodes, comprising leaf nodes, disposed in hierarchical levels of the subtrees, and wherein the parent nodes of the binary search tree contain markers to guide the packet processing circuitry in accessing the descendant nodes while traversing the binary search tree in a direction from the root node to the leaf nodes.

13. The apparatus according to claim 12, wherein one or more of the markers are stored among the action codes in the entries of the hash table.

14. The apparatus according to claim 12, wherein the markers include jump markers, which guide traversal of the search tree from a given parent node to a descendant node that is separated from the parent node in the binary search tree by at least one intermediate hierarchical level.

15. The apparatus according to claim 12, wherein the markers in the parent nodes indicate whether longer compatible prefixes exist in a lower hierarchical level of one of the subtrees.

16. The apparatus according to claim 10, wherein c=1, and wherein each entry in the respective hash table of each node in the binary search tree is configured to contain two different actions indicated by respective binary values of the single LSB of the address prefixes represented by the entry.

17. The apparatus according to claim 10, wherein c=2, and wherein each entry in the respective hash table of each node in the binary search tree is configured to contain four different actions indicated by respective values of the two LSB of the address prefixes represented by the entry.

18. The apparatus according to claim 10, wherein c=2, and wherein storing the respective hash table comprises creating, in the respective hash table of a given node j in the binary search tree, two entries representing the $L_j$-2 MSB that are shared by a group of the address prefixes of length $L_j$, wherein each of the two entries in the hash table is configured to contain two different actions indicated by two respective values of the two LSB of the address prefixes in the group.

19. A computer software product, comprising a non-transitory computer-readable medium in which program instructions are stored, which instructions, when read by a programmable processor, cause the processor to store, in a memory, a representation of a routing table for a network as a binary search tree of address prefixes ordered by prefix lengths, such that each node j in the binary search tree corresponds to a respective prefix length $L_j$, and to store for each node j in the binary search tree, a respective hash table comprising entries representing the address prefixes of length $L_j$, each address prefix comprising $L_j$-c most significant bits (MSB) and c least significant bits (LSB), and each entry in the respective hash table comprising a matching value corresponding to the $L_j$-c MSB of one or more of the address prefixes and one or more action codes indexed by the c LSB of the one or more of the address prefixes, wherein the instructions cause the processor, upon receiving from the network a data packet having a destination address, to traverse the binary search tree to find a longest prefix match between the destination address and the address prefixes by extracting, at each node j that is traversed, a key of length $L_j$ from the destination address, performing a hash lookup in the respective hash table over the $L_j$-c MSB of the key to find a matching entry, and selecting from the matching entry an action code indicated by the c LSB of the key, and to process the data packet in accordance with the action code indicated by the matching entry that corresponds to the longest prefix match.

* * * * *